(12) United States Patent
Yamaguchi et al.

(10) Patent No.: US 8,330,571 B2
(45) Date of Patent: Dec. 11, 2012

(54) VEHICLE ELECTRONIC KEY SYSTEM

(75) Inventors: Jun Yamaguchi, Aichi (JP); Toshiharu Katagiri, Aichi (JP); Takumi Tamezane, Aichi (JP); Yoshiyuki Seki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 600 days.

(21) Appl. No.: 12/578,284

(22) Filed: Oct. 13, 2009

(65) Prior Publication Data

US 2010/0090817 A1 Apr. 15, 2010

(30) Foreign Application Priority Data

Oct. 14, 2008 (JP) .................. 2008-265521

(51) Int. Cl.
*H04B 1/38* (2006.01)

(52) U.S. Cl. .................. 340/5.61; 340/5.72; 340/426.36

(58) Field of Classification Search ............... 340/426.1, 340/426.16, 426.22, 426.24, 426.35, 426.36, 340/5.6, 5.61, 5.64, 5.72; 701/36
See application file for complete search history.

(56) References Cited

U.S. PATENT DOCUMENTS

| | | | |
|---|---|---|---|
| 5,079,435 A * | 1/1992 | Tanaka | 340/5.65 |
| 6,518,882 B2 * | 2/2003 | Johnson et al. | 340/426.28 |
| 7,930,915 B2 * | 4/2011 | Katagiri | 70/456 R |
| 8,011,214 B2 * | 9/2011 | Katagiri et al. | 70/456 R |
| 8,138,887 B2 * | 3/2012 | Hirano | 340/5.6 |
| 2004/0135670 A1 * | 7/2004 | Guba | 340/5.72 |
| 2006/0028353 A1 * | 2/2006 | Mueller et al. | 340/825.69 |
| 2008/0127693 A1 * | 6/2008 | Cadiz et al. | 70/456 R |

FOREIGN PATENT DOCUMENTS

WO   WO 01/25572 A1   10/2000

* cited by examiner

*Primary Examiner* — Thomas Mullen
(74) *Attorney, Agent, or Firm* — Duane Morris LLP; J. Rodman Steele, Jr.; Gregory M. Lefkowitz

(57) ABSTRACT

A vehicle electronic portable key system including a master key and sub-key. A retainer is arranged in the vehicle to retain the sub-key. A control unit determines whether the master key or sub-key is located in a vehicle interior or exterior wireless communicatable area. When the key is located in one of the wireless communicatable areas, the control unit permits various operations of the vehicle in accordance with the communicable area in which the key is located. The control unit determines that the sub-key is in a lent state if the sub-key is removed from the retainer when the master key is located in the interior wireless communicatable area. In a state in which the sub-key is located in one of the wireless communicatable areas after removal from the retainer, the control unit limits the operations of the vehicle unless the sub-key is determined as being in the lent state.

7 Claims, 8 Drawing Sheets

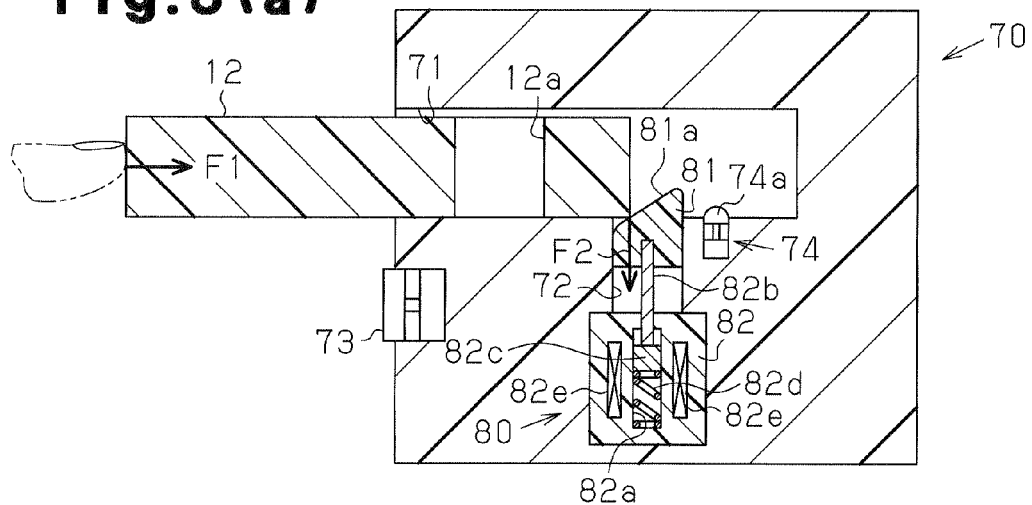
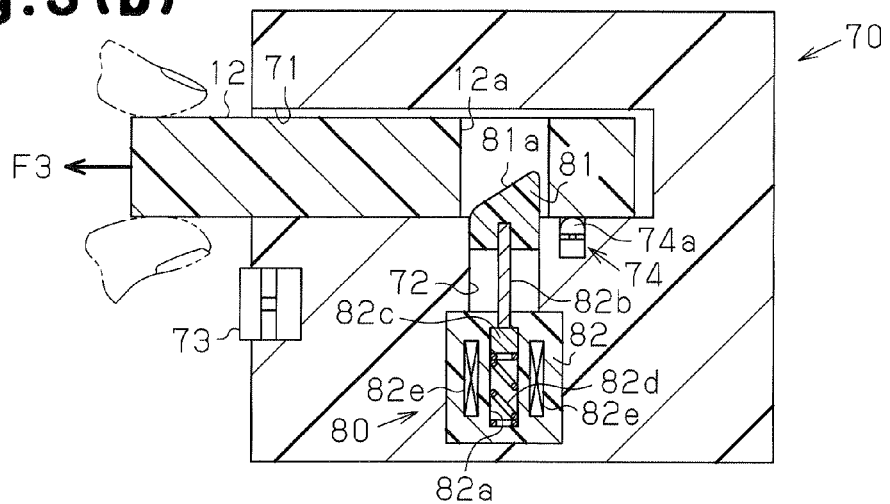
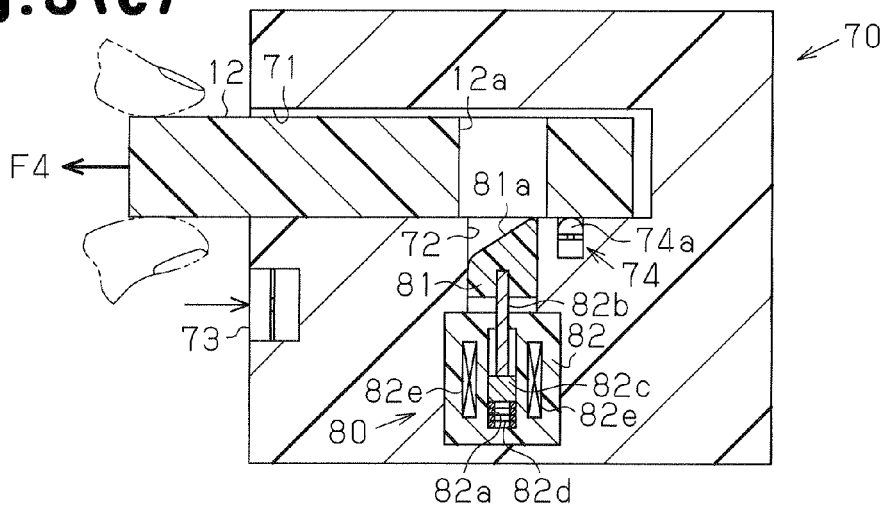

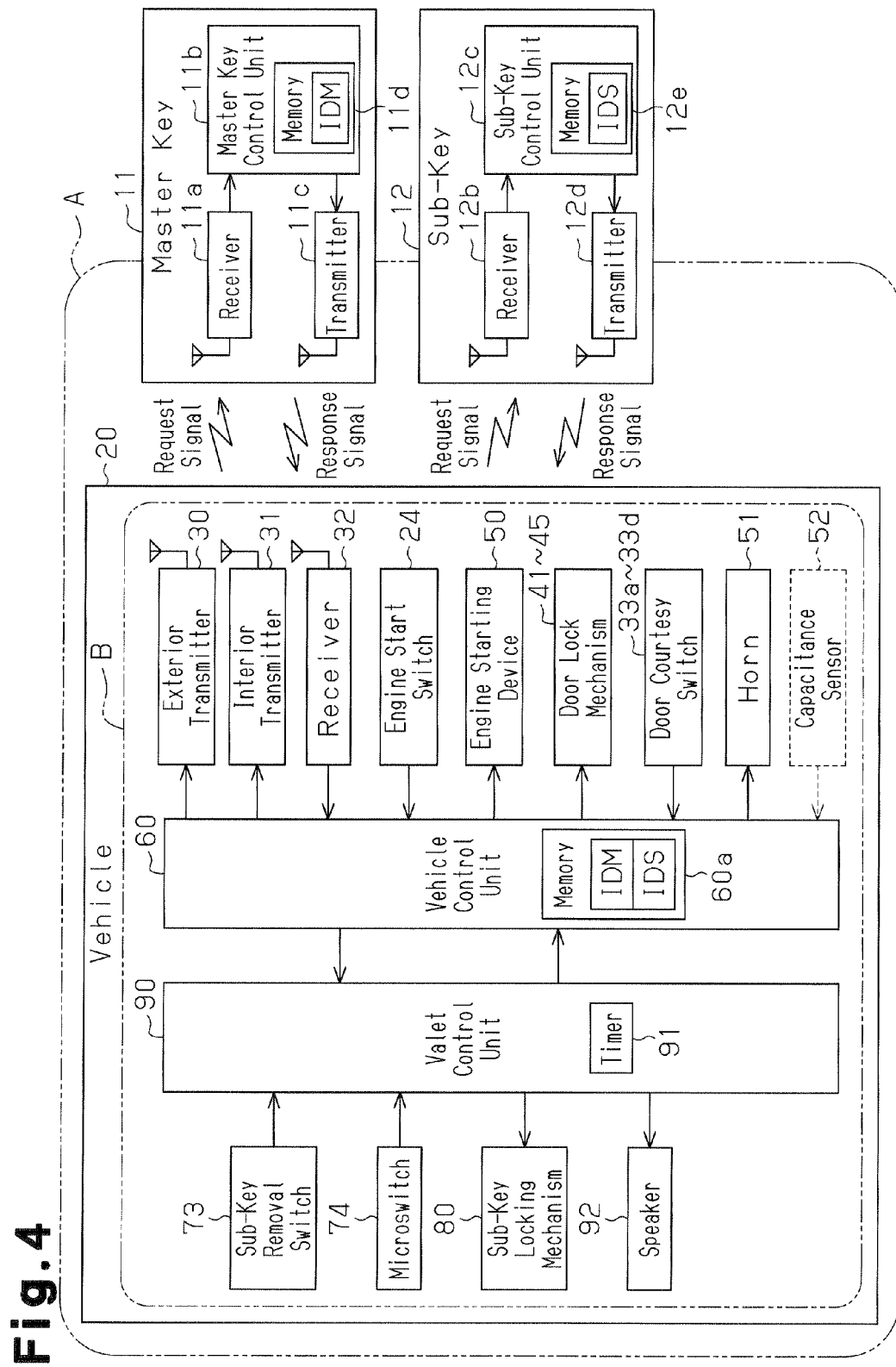

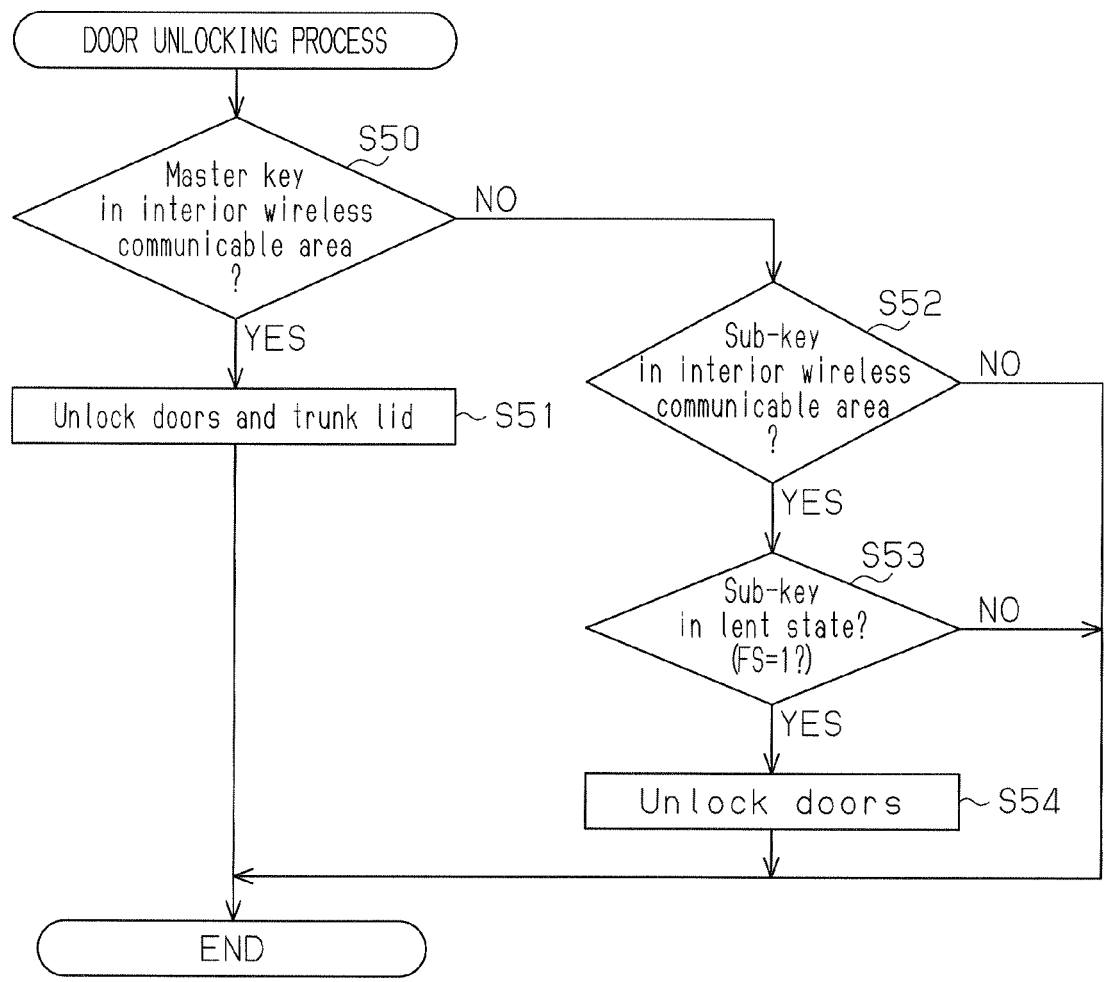

VEHICLE ELECTRONIC KEY SYSTEM

CROSS-REFERENCE TO RELATED APPLICATIONS

This application is based upon and claims the benefit of priority from prior Japanese Patent Application No. 2008-265521, filed on Oct. 14, 2008, the entire contents of which are incorporated herein by reference.

BACKGROUND OF THE INVENTION

The present invention relates to a vehicle electronic portable key system including an electronic portable key that performs wireless communication.

A vehicle electronic portable key system unlocks the doors of a vehicle when a vehicle occupant carrying a portable device (electronic portable key) approaches the doors and permits starting of the engine when the occupant enters the passenger compartment. In the vehicle electronic portable key system, wireless communication is performed between the vehicle and the electronic portable key when the electronic portable key enters an area set outside the vehicle near the vehicle doors or inside the vehicle. The wireless communication compares and verifies an identification (ID) code stored in the electronic portable key with an ID code stored in the vehicle. When determined that the two ID codes are in conformance with each other, the vehicle doors are unlocked and starting of the engine is permitted. The vehicle electronic portable key system reduces manual operations performed by the vehicle occupant and improves vehicle convenience.

When the owner of a vehicle implementing the vehicle electronic portable key system uses valet parking service, the owner gives the electronic portable key to a third person, such as a hotel attendant. In such a case, the third person who is given the electronic portable key may, for example, unlock the trunk without permission from the owner and remove valuables from the trunk. Japanese Laid Open Patent Publication No. 2003-511588 describes technology for preventing such tampering of a vehicle.

The vehicle electronic portable key system of Japanese Laid Open Patent Publication No. 2003-511588 uses electronic portable keys, which include a master key and a sub-key. The sub-key is lent to a third person. The master key and the sub-key have different ID codes. When ID code verification is performed through wireless communication that takes place between the vehicle and an electronic portable key, the vehicle electronic portable key system prohibits unlocking of the trunk lid by a vehicle occupant if the ID code of the sub-key is verified. Since the trunk lid cannot be unlocked by the sub-key, tampering of the vehicle may be prevented.

However, the sub-key is used only when it is lent to a third person. Thus, there is a tendency for the sub-key being left in, for example, a glove box in the passenger compartment. When a person breaks into the vehicle and steals the sub-key, the person would be able to steal the vehicle.

SUMMARY OF THE INVENTION

It is an object of the present invention to provide a vehicle electronic portable key system that improves the level of security.

One aspect of the present invention is a vehicle electronic portable key system including an electronic portable key, a retainer, and a control unit. The electronic portable key is capable of performing wireless communication and includes a master key and a sub-key. The retainer is arranged in a vehicle to retain the sub-key in the vehicle. The control unit monitors wireless communication performed between the electronic portable key and the vehicle to determine whether the electronic portable key is located in an interior wireless communicatable area formed inside the vehicle or an exterior wireless communicatable area formed outside the vehicle. In a state in which the electronic portable key is detected as being located in either one of the wireless communicatable areas, the control unit is programmed to permit various operations of the vehicle to be performed in accordance with the communicable area in which the electronic portable key is located. The control unit is programmed to determine that the sub-key is in a lent state when removal of the sub-key from the retainer is detected in a state in which the master key is located in the interior wireless communicatable area. In a state in which the sub-key is detected as being located in the interior wireless communicatable area or the exterior wireless communicatable area after removal from the retainer, the control unit is programmed to limit the operations of the vehicle that can be performed in accordance with the communicable area in which the sub-key is located unless the sub-key is determined as being in the lent state.

In this structure, for example, when the vehicle owner who is carrying the master key removes the sub-key from the retainer, the sub-key would be removed from the retainer in a state in which the vehicle owner, or the master key, is located in the vehicle. Thus, the control unit determines that the sub-key is in a lent state. If a person breaks into the vehicle without the vehicle owner knowing and wrongfully removes the sub-key from the retainer, the sub-key would be removed from the retainer in a state in which the vehicle owner, or the master key, is not located in the vehicle. Thus, the control unit determines that the sub-key is not in a lent state. The control unit limits the operations of the vehicle that can be performed in accordance with the communicable area in which the sub-key is located when determining that the sub-key is not in the lent state. This deters a person who has stolen the sub-key from performing unauthorized vehicle operations and thereby improves the security level of the vehicle electronic portable key system.

In the vehicle electronic portable key system, when determining that the sub-key is not in the lent state, the control unit prohibits all of the operations of the vehicle in a state in which the sub-key is detected as being located in the interior wireless communicatable area or the exterior wireless communicatable area after removal from the retainer.

In this structure, a person who has stolen the sub-key is prevented from performing unauthorized vehicle operations. This improves the security level of the vehicle electronic portable key system.

In the vehicle electronic portable key system, when determining that the sub-key is not in the lent state, the control unit activates a warning device arranged in the vehicle to issue a warning in a state in which the sub-key is detected as being located in the interior wireless communicatable area or the exterior wireless communicatable area after removal from the retainer.

In this structure, a warning is issued when the probability of a person who has stolen the sub-key being located in a communicable area. This deters the person who has stolen the sub-key from performing unauthorized vehicle operations and thereby improves the security level of the vehicle electronic portable key system.

In the vehicle electronic portable key system, the retainer includes a sub-key locking mechanism, which locks the sub-key in a state retained in the retainer, and a sub-key removal switch, which when pressed by a vehicle occupant unlocks the sub-key from the sub-key unlocking mechanism. The sub-key locking mechanism automatically locks the sub-key when the sub-key is retained in the retainer and unlocks the sub-key when the sub-key removal switch is pressed in a state in which the master key is located in the vehicle.

In this structure, if a person breaks into the vehicle without the vehicle owner knowing and presses the sub-key removal switch to remove the sub-key from the retainer, the sub-key removal switch would be pressed in a state in which the vehicle owner, or the master key, is not located in the vehicle. Thus, the sub-key remains locked. When the sub-key is returned to the retainer, the sub-key is automatically locked. Thus, the sub-key is not left in the vehicle in an unlocked state. This deters a person who has stolen the sub-key from performing unauthorized vehicle operations and thereby improves the security level of the vehicle electronic portable key system.

In the vehicle electronic portable key system, when the presence of the master key in the vehicle is undetected at a time in which the sub-key is retained in the retainer, the control unit issues a notification that the sub-key will become irremovable from the retainer and unlocks the sub-key.

In this structure, when the master key is not located in the vehicle at a time in which the sub-key is retained in the retainer, the control unit issues a notification that the sub-key will become irremovable from the retainer and unlocks the sub-key. This prompts a person who has left the sub-key retained in the retainer to remove the sub-key from the retainer. Thus, a situation is avoided in which, for example, the person who borrows the sub-key is also forced to borrow the master key as well from the vehicle owner.

In the vehicle electronic portable key system, the control unit prohibits selected ones of the operations of the vehicle in a state in which the sub-key is detected as being located in the interior wireless communicatable area or the exterior wireless communicatable area after removal from the retainer.

In the vehicle electronic portable key system, the control unit prohibits unlocking of a trunk lid of the vehicle, permits starting of the engine of the vehicle, and restricts the speed at which the vehicle is driven in a state in which the sub-key is detected as being located in the interior wireless communicatable area or the exterior wireless communicatable area after removal from the retainer.

In these structures, the convenience and the security level of the vehicle electronic portable key system are both improved.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3(a) to 3(c) are cross-sectional views illustrating insertion of the sub-key into the retainer and removal of the sub-key from the retainer;

FIG. 4 is a block diagram of a vehicle electronic portable key system;

FIG. 9 is a flowchart showing a door unlock process in a second embodiment of the present invention.

DETAILED DESCRIPTION OF THE PREFERRED EMBODIMENTS

A first embodiment of vehicle electronic portable key system according to the present invention will now be discussed.

Figure 1:
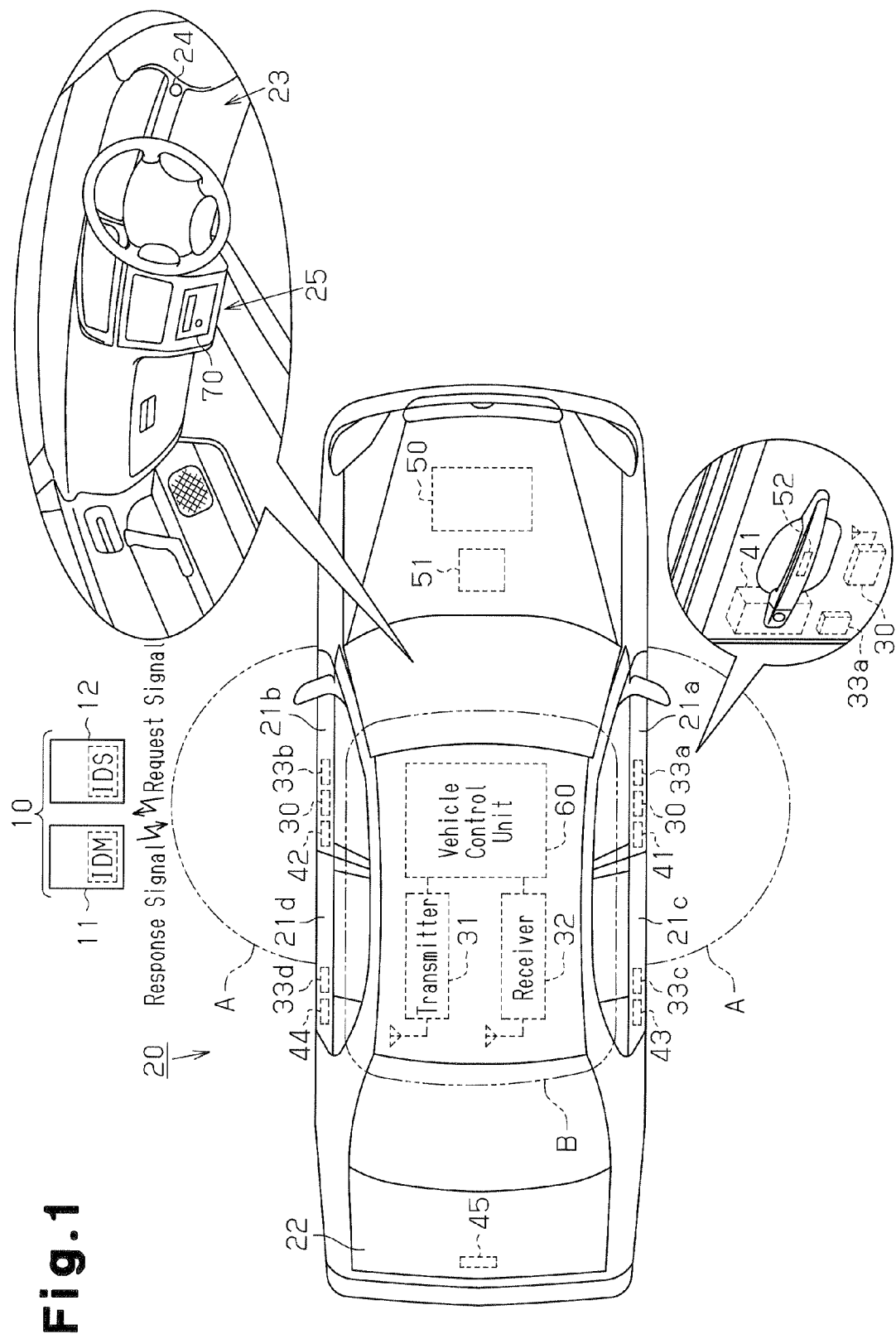
FIG. 1 is a plan view showing a first embodiment of a vehicle electronic portable key system according to the present invention.

The vehicle electronic portable key system will be described with reference to FIG. 1. The vehicle electronic portable key system sets exterior wireless communicatable areas A and an interior wireless communicatable area B for a vehicle 20. The exterior wireless communicatable areas A are set outside the vehicle near a driver door 21a and a front passenger door 21b. The interior wireless communicatable area B is set in the passenger compartment of the vehicle. When a vehicle occupant who is carrying an electronic portable key 10 (portable device) enters area A or B, various signals including a request signal and a response signal are transferred through wireless communication between the electronic portable key 10 and the vehicle 20. The vehicle electronic portable key system verifies an identification (ID) code stored in the electronic portable key 10 with an ID code stored in the vehicle. When it is determined that the two ID codes are in conformance with each other, the vehicle electronic portable key system unlocks the doors 21a to 21d and allows the execution of various controls, such as permitting the starting of the engine. When engine starting is permitted, the vehicle occupant may, for example, start the engine by pressing an engine start switch 24 arranged on an instrument panel 23 of the vehicle.

The electronic portable key 10 includes a master key 11 and a sub-key 12. The master key 11 is normally carried by the owner of the vehicle 20. The sub-key 12 is lent to a person other than the vehicle owner. The master key 11 and the sub-key 12 respectively have ID codes IDM and IDS, which differ from each other. The ID code IDM is stored in a memory incorporated in the master key 11, and the ID code IDS is stored in a memory incorporated in the sub-key 12. When receiving a request signal transmitted from the vehicle 20, the master key 11 transmits a response signal including the ID code IDM in response to the request signal, and the sub-key 12 transmits a response signal including the ID code IDS in response to the request signal.

The driver door 21a and the front passenger door 21b each include an exterior transmitter 30, which transmits a request signal to the corresponding exterior wireless communicatable area A. An interior transmitter 31, which transmits a request signal to the interior wireless communicatable area B, is arranged in the passenger compartment of the vehicle 20. A receiver 32, which receives the response signal from the electronic portable key 10, is arranged in the passenger compartment of the vehicle 20. The doors 21a to 21d and a trunk lid 22 respectively include door lock mechanisms 41 to 45. A vehicle control unit 60 is arranged in the vehicle 20 to control the transmission of the request signals from the transmitters 30 and 31 and process the response signal received by the receiver 32. The vehicle control unit 60 executes a control related to the starting and stopping of the engine with an engine starting device 50 and various operations of the vehicle 20 such as the honking of a vehicle horn 51. The vehicle control unit 60 receives detection signals from various switches in the vehicle to control various operations of the vehicle 20. The switches include the engine start switch 24 and door courtesy switches 33a to 33d, which detect open states of the doors 21a to 21d.

The vehicle electronic portable key system includes a retainer 70, which retains the sub-key 12 when the sub-key 12. is not lent to a third party. In the illustrated example, the retainer 70 is arranged in a center console 25 of the vehicle 20.

The structures of the sub-key 12 and the retainer 70 will now be discussed with reference to FIGS. 2(a) and 2(b). FIG. 2(b) is a rough view of the sub-key 12 and the retainer 70.

Figure 2A:
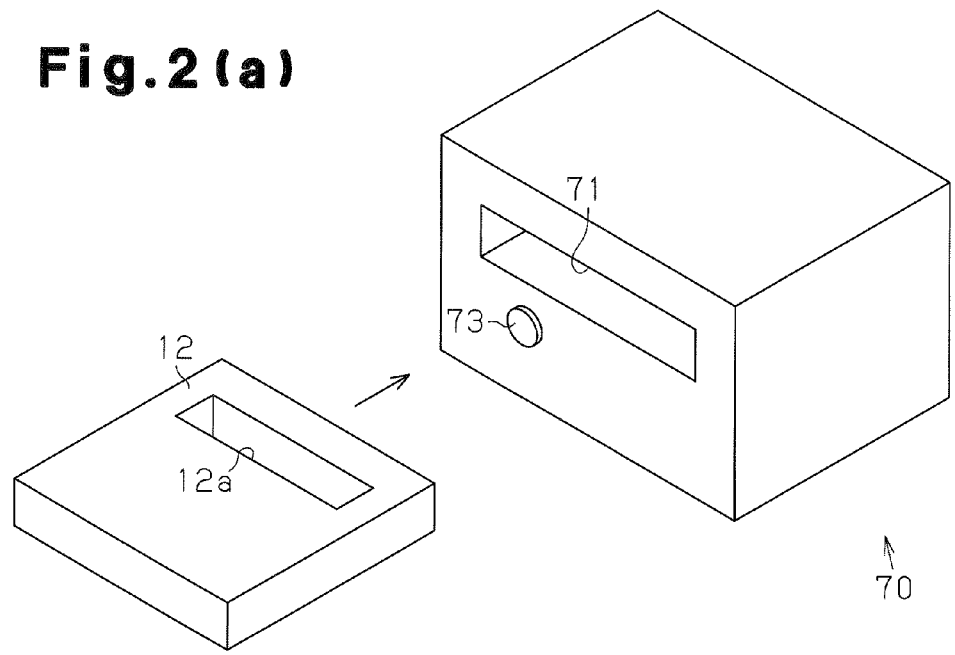
FIGS. 2(a) and 2(b) are respectively a perspective view and a cross-sectional view showing a sub-key and a retainer of FIG. 1.
Figure 2B:
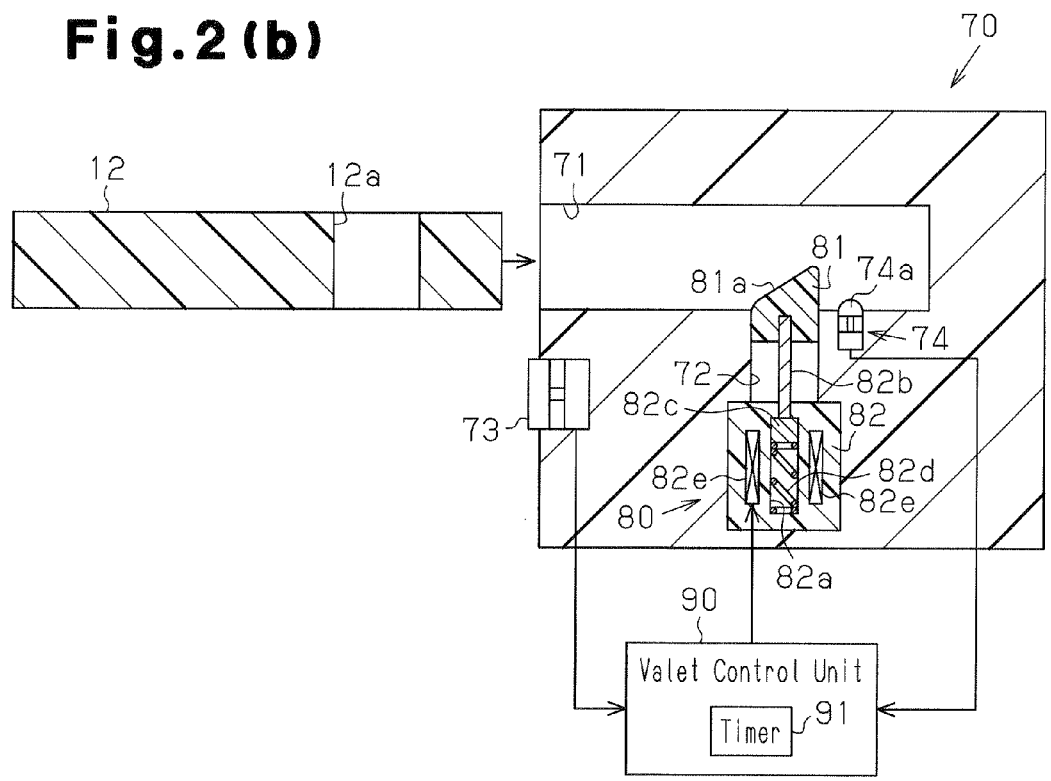

In the example of FIG. 2(a), the sub-key 12 is of a so-called card type. A rectangular hole 12a extends through a portion of the sub-key 12 near the distal end. The retainer 70 is, for example, a resin box having a front opening such as a rectangular slot 71. The sub-key 12 is inserted into the slot 71.

A sub-key locking mechanism 80 locks the sub-key 12 when retained in the slot 71. The sub-key locking mechanism 80 includes a needle 81 and an actuator 82. Referring to FIG. 2(b), the needle 81, which is arranged in a recess 72 formed in the bottom surface of the slot 71, moves along the recess 72. The actuator 82 moves the needle 81 back and forth.

The needle 81 has a distal portion including an inclined surface 81a facing toward the opening of the slot 71. The inclined surface 81a of the needle 81 is partially or entirely exposed in the slot 71. The distal portion of the sub-key 12 inserted into the slot 71 comes into contact with the inclined surface 81a (refer to FIG. 3(a)).

The actuator 82 includes an armature 82c and a coil spring 82d, which are arranged in a cavity 82a. The armature 82c is formed from a magnetic material and connected to the needle 81 by a rod 82b. The coil spring 82d applies urging force to the bottom surface of the armature 82c. Normally, the elastic force of the coil spring 82d urges the armature 82c upward as viewed in FIG. 2(b) until the armature 82c comes into contact with the upper wall of the cavity 82a. This holds the distal portion of the needle 81 in a state exposed in the slot 71.

An electromagnetic coil 82e is arranged around the armature 82c and the coil spring 82d. When current flows through the electromagnetic coil 82e, the armature 82c is magnetically attracted and moved downward, as viewed in FIG. 2(b), against the elastic force of the coil spring 82d. This hides the distal portion of the needle 81 in the recess 72. Then, the flow of current to the electromagnetic coil 82e is stopped to demagnetize the electromagnetic coil 82e. As a result, the elastic force of the coil spring 82d moves the armature 82c upward until it comes into contact with the upper wall of the cavity 82a again. This projects the distal portion of the needle 81 into the slot 71.

A valet control unit 90 controls the magnetizing and demagnetizing of the electromagnetic coil 82e. A sub-key removal switch 73, which is arranged in the front surface of the retainer 70, generates an output signal when pressed. When the pressing of the sub-key removal switch 73 is detected from the output signal, the valet control unit 90 magnetizes the electromagnetic coil 82e. If a predetermined time T1 elapses from when the pressing of the sub-key removal switch 73 is detected, the valet control unit 90 demagnetizes the electromagnetic coil 82e. The valet control unit 90 includes a timer 91 to measure the elapsed time from when the pressing of the sub-key removal switch 73 is detected. A microswitch 74, which has a projection 74a projecting into the slot 71, is arranged on the bottom surface of the slot 71. The microswitch 74 generates an output signal that is also retrieved by the valet control unit 90. In one example, the microswitch 74 is deactivated when the projection 74a is projected into the slot 71. Insertion of the sub-key 12 into the slot 71 pushes the projection 74a into the bottom wall of the slot 71 and activates the microswitch 74. In this manner, the valet control unit 90 detects whether or not the sub-key 12 is retained in the slot 71 from the state of the microswitch 74.

The operation of the retainer 70 when the sub-key 12 is inserted into the slot 71 and the operation of the retainer 70 when the sub-key 12 is removed from the slot 71 will now be described with reference to FIGS. 3(a) to 3(c).

FIG. 3(a) shows a state in which the vehicle owner is inserting the sub-key 12 into the slot 71. When the distal portion of the sub-key 12 contacts the inclined surface 81a of the needle 81, force F1 applied by the vehicle owner to push the sub-key 12 is partially converted to force F2 acting in the axial direction of the rod 82b of the actuator 82 by the inclined surface 81a. This moves the needle 81, rod 82b, and armature 82c downward against the elastic force of the coil spring 82d.

Then, as shown in the state of FIG. 3(b), when the sub-key 12, which is inserted into the slot 71, is further moved to a position at which the hole 12a of the sub-key 12 is aligned with the needle 81, the elastic force of the coil spring 82d inserts the needle 81 into the hole 12a. In such a state in which the needle 81 is inserted into the hole 12a, for example, if the vehicle owner applies force F3 in the leftward direction of FIG. 3(b) to the sub-key 12 in order to remove the sub-key 12 from the slot 71, the wall of the hole 12a in the sub-key 12 comes into contact with the right wall of the needle 81. Thus, the sub-key 12 cannot be removed from the slot 71 due to the interference of the needle 81. In other words, the sub-key 12 is locked to the retainer 70. In this manner, the sub-key 12 is automatically locked to the retainer 70 after being inserted into the slot 71. This avoids a state in which the sub-key 12 remains left in the vehicle 20 without being in a locked state and prevents a person who has broken into the vehicle 20 from stealing the sub-key 12. In one example, when the sub-key 12 is inserted into the slot 71, the projection 74a of the microswitch 74 is pushed into the wall of the slot 71. This activates the microswitch 74.

FIG. 3(c) shows a state in when the vehicle owner, who is holding the master key 11, presses the sub-key removal switch 73. In this case, the sub-key locking mechanism 80 draws the needle 81 into the recess 72 and unlocks the sub-key 12. Thus, the vehicle owner may remove the sub-key 12 from the slot 71 by applying force F4 in the leftward direction of FIG. 3(c) to the sub-key 12. When the sub-key 12 is removed from the slot 71, the microswitch 74 is deactivated.

The vehicle electronic portable key system will now further be described with reference to FIG. 4. For example, when the vehicle 20 is in a parked state, the vehicle control unit 60 transmits a request signal in predetermined cycles to the exterior wireless communicatable areas A from the exterior transmitters 30. When the master key 11 carried by the vehicle owner enters any of the exterior wireless communicatable areas A, the vehicle 20 performs wireless communication with the master key 11. That is, the request signal transmitted from the corresponding exterior transmitter 30 is received by a receiver 11a of the master key 11. The request signal is then provided to a control unit 11b of the master key 11. When provided with the request signal, the master key control unit 11b generates a response signal including the ID code IDM, which is stored in a memory 11d. The master key control unit 11b then transmits the response signal from a transmitter 11c to the vehicle 20. The receiver 32 of the vehicle 20 receives the response signal and provides the response signal to the vehicle control unit 60. The vehicle control unit 60 compares and verifies the ID code included in the provided response signal with an ID code stored beforehand in a memory 60a, which is incorporated in the control unit 60. When determined that the ID code IDM of the master key 11 included in the response signal is authentic, the vehicle control unit 60 opens the door lock mechanisms 41 to 45 to unlock the doors 21a to 21d and trunk lid 22. When the response signal is received from the master key 11 after the exterior transmitters 30 transmit the request signal, the vehicle control unit 60 determines that the master key 11 is located in one of the exterior wireless communicatable areas A.

When detecting that the open driver door 21a has been closed, the vehicle control unit 60 transmits a request signal to the interior wireless communicatable area B from the interior transmitter 31. In this state, when the master key 11 carried by the vehicle owner enters the interior wireless communicatable area B, wireless communication is performed between the vehicle 20 and the master key 11 to perform ID code verification. When the ID code verification is successful, the vehicle control unit 60 permits the starting of the engine with the engine starting device 50. When the response signal is received from the master key 11 after the request signal is transmitted from the interior transmitter 31, the vehicle control unit 60 determines that the master key 11 is located in the interior wireless communicatable area B.

The timing at which the request signal is transmitted to the exterior wireless communicatable areas A from the exterior transmitters 30 differs from the timing at which the request signal is transmitted to the interior wireless communicatable area B. This allows for the vehicle control unit 60 to accurately determine whether the master key 11 is located in one of the exterior wireless communicatable areas A or the interior wireless communicatable area B.

In the same manner as the master key 11, the sub-key 12 includes a receiver 12b, a transmitter 12d, and a control unit 12c. The control unit 12c incorporates a memory 12e, which stores the ID code IDS of the sub-key 12. When the sub-key 12 enters one of the exterior wireless communicatable areas A or the interior wireless communicatable area B, ID code verification is performed through wireless communication as described above. When determined that the ID code IDS of the sub-key 12 included in the response signal transmitted from the sub-key 12 is authentic, the vehicle control unit 60 unlocks the doors 21a to 21d while keeping the trunk lid 22 locked and permits the starting of the engine. The vehicle control unit 60 performs a process similar to that performed for the master key 11 to determine whether the sub-key 12 is located in one of the exterior wireless communicatable areas A or the interior wireless communicatable area B.

The position information of the master key 11 and the sub-key 12 is stored in the memory 60a of the vehicle control unit 60. The memories 11d, 12e, and 60a are normally non-volatile.

The valet control unit 90 retrieves the position information of the master key 11 from the vehicle control unit 60. Based on output signals from the sub-key removal switch 73 and the microswitch 74, the valet control unit 90 executes a sub-key unlocking process and drives the sub-key locking mechanism 80 to unlock the sub-key 12. When executing various types of processes such as the sub-key unlocking process, the valet control unit 90 switches a lending flag Fs between on and off in accordance with whether or not the sub-key 12 is being lent to a third person. The valet control unit 90 further drives a speaker 92, which is arranged in the passenger compartment, to issue a warning notifying that the sub-key 12 will become irremovable from the retainer 70. In one example, the lending flag Fs is stored in a specific region of a memory or register incorporated in the valet control unit 90. The lending flag Fs is set to a value of "1" in an on state and a value of "0" in an off state.

The vehicle control unit 60 retrieves the on/off information of the lending flag Fs and the on/off information of the microswitch 74 from the valet control unit 90. Based on such pieces of information in addition to the position information of the master key 11 and sub-key 12 and the on/off information of the door courtesy switch 33a, the vehicle control unit 60 executes a system mode setting process to set the state (mode) of the vehicle electronic portable key system. The vehicle electronic portable key system functions in four modes, which are described below in paragraphs (a1) to (a4).

(a1) Normal Mode

When the vehicle electronic portable key system is set in the normal mode, a vehicle occupant is permitted to perform each and every operation of the vehicle, including an engine starting operation performed by pressing the engine start switch 24 and the unlocking of the trunk lid 22.

(a2) Valet Mode

When the vehicle electronic portable key system is set in the valet mode, the engine starting operation is performed by pressing the engine start switch 24 is permitted. However, the unlocking of the trunk lid 22 is prohibited. Further, the speed of the vehicle 20 at which the vehicle can be driven is restricted to a predetermined speed (e.g., 20 km/hr).

(a3) Vehicle Operation Prohibition Mode

When the vehicle electronic portable key system is set in the vehicle operation prohibition mode, the engine starting operation, which is performed by pressing the engine start switch 24, and the unlocking of the trunk lid 22 are prohibited.

(a4) Security Mode

When the vehicle electronic portable key system is set in the security mode, the engine starting operation, which is performed by pressing the engine start switch 24, and the unlocking of the trunk lid 22 are prohibited. In addition, when the engine start switch 24 is pressed, security measures are taken. For example, a warning is issued with a warning device such as the horn 51.

In the system mode setting process, the vehicle control unit 60 sets the vehicle electronic portable key system in the normal mode when determining that the master key 11 is located in the interior wireless communicatable area B and sets the vehicle electronic portable key system in the valet mode when determining that only the sub-key 12 is located in the interior wireless communicatable area B. When the engine is running such as when the vehicle 20 is being driven, the vehicle electronic portable key system is set in either the normal mode or the valet mode. Further, when determining that the master key 11 and the sub-key 12 are both not located in the interior wireless communicatable area B or when determining that the master key 11 is not located in the interior wireless communicatable area B and the sub-key 12 is retained in the retainer 70, the vehicle control unit 60 sets the vehicle electronic portable key system in the vehicle operation prohibition mode. When determining that the sub-key 12 has been removed in a wrongful manner from the retainer 70, the vehicle control unit 60 sets the vehicle electronic portable key system in the security mode. In the first embodiment, the vehicle electronic portable key system is set in the security mode to deter a person who has stolen the sub-key 12 from performing unauthorized vehicle operations.

The sub-key unlocking process performed by the valet control unit 90 will now be discussed in detail with reference to FIG. 5. In one example, the sub-key unlocking process is a process for unlocking the sub-key 12 with the sub-key locking mechanism 80. A process for setting the lending flag Fs is also performed in parallel to the sub-key unlocking process. The process illustrated in the flowchart of FIG. 5 is performed in predetermined cycles when, for example, the accessory switch of the vehicle 20 is activated, that is, the main power of the vehicle 20 is activated.

Figure 5:
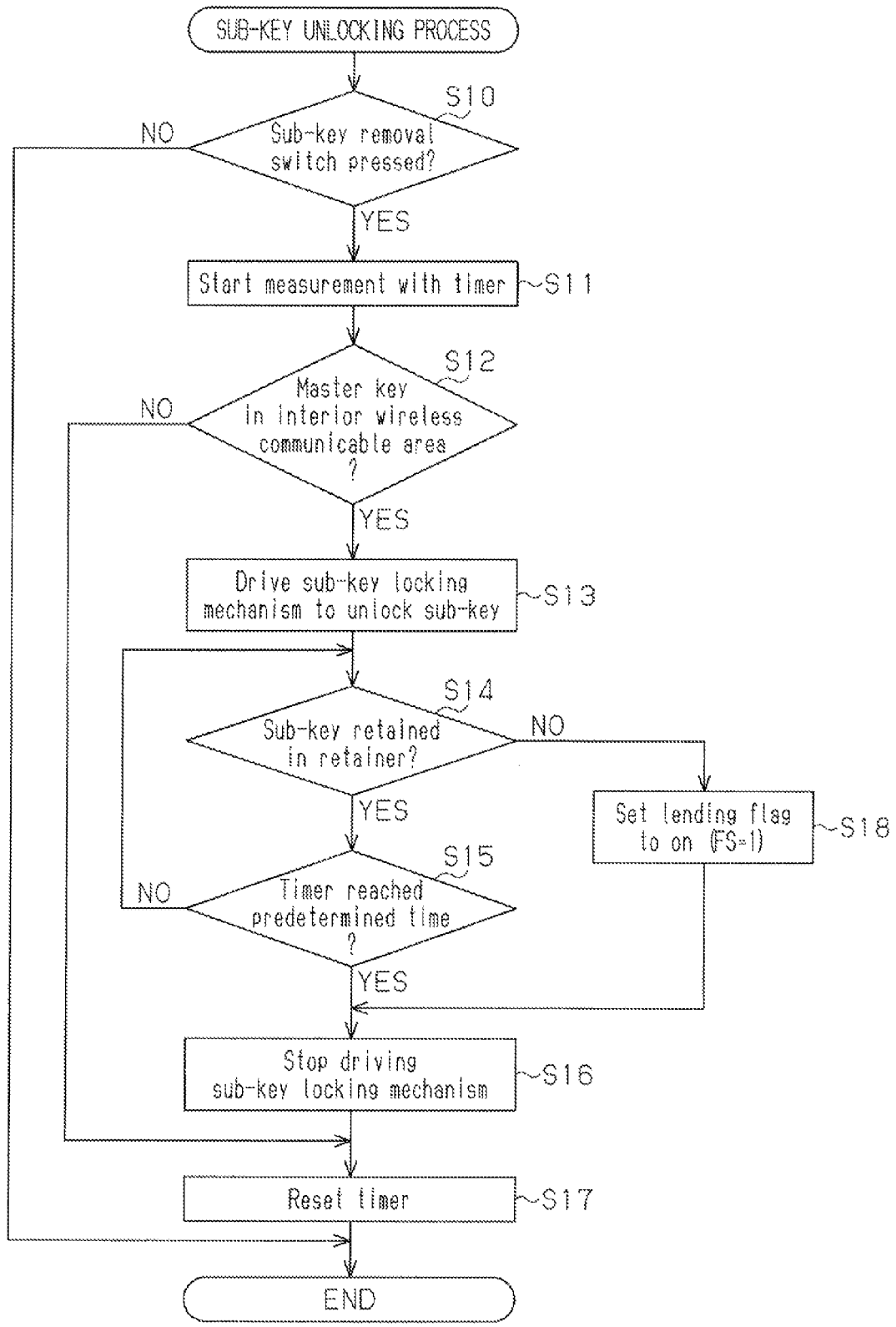
FIG. 5 is a flowchart of a sub-key releasing process.

As shown in FIG. 5, in this process, the valet control unit 90 first determines whether or not the sub-key removal switch 73 has been pressed (step S10). When determining that the sub-key removal switch 73 has not been pressed (step S10: NO), the valet control unit 90 terminates this process.

When determined that the sub-key removal switch 73 has been pressed (step S10: YES), the timer 91 starts measuring time (step S11) and the valet control unit 90 determines whether or not the master key 11 is located in the interior wireless communicatable area B (step S12). In one example, in the sub-key unlocking process, the valet control unit 90 determines through step S12 whether or not the vehicle owner who is carrying the master key 11 is in the passenger compartment. When determined that the master key 11 is not located in the interior wireless communicatable area B (step S12: NO), the valet control unit 90 resets the value of the timer 91 (step S17) and terminates the process.

When determining that the master key 11 is located in the interior wireless communicatable area B (step S12: YES), the valet control unit 90 drives the sub-key locking mechanism 80 to unlock the sub-key 12 (step S13) so that the sub-key 12 becomes removable from the retainer 70. After step S13, the valet control unit 90 determines from the output signal of the microswitch 74 whether or not the sub-key 12 is retained in the retainer (step S14). When determining that the sub-key 12 is retained in the retainer 70 (step S14: YES), the valet control unit 90 further determines whether or not the time measured by the timer 91 has reached a predetermined time T1 (step S15). When the time measured by the timer 91 has not yet reached the predetermined time (step S15: NO), if the sub-key 12 has been removed from the retainer 70 and the valet control unit 90 thereby determines that the sub-key 12 is not retained in the retainer 70 (step S14: NO), the valet control unit 90 sets the lending flag Fs to an on state (step S18). Specifically, in step S18, the value of the lending flag Fs is set to "1". Subsequent to step S18, the valet control unit 90 stops driving the sub-key locking mechanism 80 (step S16), resets the value of the timer 91 (step S17), and then terminates this process.

When determining in step S15 that the time measured by the timer 91 has reached the predetermined time T1 (step S15: YES), the valet control unit 90 stops driving the sub-key locking mechanism 80 (step S16). In this manner, in the sub-key unlocking process, when the sub-key removal switch 73 is pressed and the sub-key 12 is unlocked but not removed from the retainer 70, the valet control unit 90 locks the sub-key 12 again. After step S16, the valet control unit 90 resets the value of the timer 91 (step S17) and terminates this process.

Due to the execution of the sub-key unlocking process, the sub-key 12 becomes removable from the retainer 70 only when the person carrying the master key 11, such as the vehicle owner, presses the sub-key removal switch 73. This prevents the sub-key 12 from being stolen by a person other than the vehicle owner. Further, the lending flag Fs is set to the on state only when the vehicle owner presses the sub-key removal switch 73.

The process for setting the lending flag Fs to an off state will now be discussed. In the first embodiment, the flag setting process is executed when the engine is running. The flag setting process is executed differently depending on whether the vehicle electronic portable key system is set in the normal mode or the valet mode. More specifically, when the vehicle electronic portable key system is set in the normal mode, the valet control unit 90 repetitively executes a normal mode lending flag setting process (FIG. 6) in predetermined cycles. When the vehicle electronic portable key system is set in the valet mode, the valet control unit 90 repetitively executes a valet mode lending flag setting process (FIG. 7) in predetermined cycles.

Figure 6:
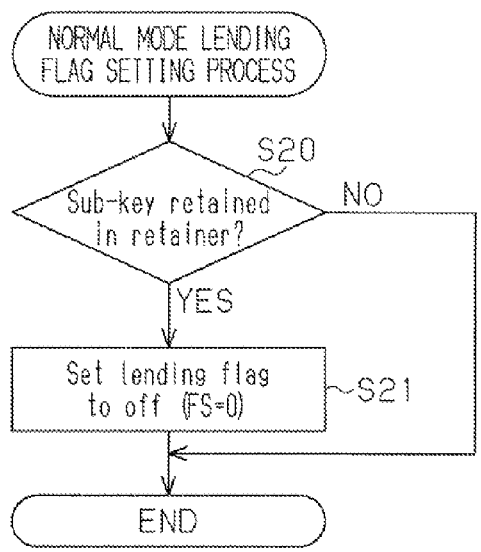
FIG. 6 is a flowchart of a lending flag setting process performed in a normal mode.

The normal mode lending flag setting process executed by the valet control unit 90 will now be discussed with reference to FIG. 6. The valet control unit 90 first determines whether or not the sub-key 12 is retained in the retainer 70 from the output signal of the microswitch 74 (step S20). More specifically, in step S20, when the microswitch 74 is activated, the valet control unit 90 determines that the sub-key 12 is retained in the retainer 70 (step S20: YES). When determining that the sub-key 12 is retained in the retainer 70 (step S20: YES), the valet control unit 90 sets the lending flag Fs to an off state (step S21). That is, in step S21, the value of the lending flag Fs is set to "0". When determining that the sub-key 12 is not retained in the retainer 70 (step S20: NO), the valet control unit 90 terminates this process.

When the normal mode lending flag setting process is executed, the vehicle electronic portable key system is set in the normal mode. Thus, the lending flag Fs is set to an off state as soon as, for example, the vehicle owner retains the sub-key 12 in the retainer 70.

When the sub-key 12, which was lent to another person, is returned, the vehicle owner retains the sub-key 12 in the retainer 70. As a result, the sub-key locking mechanism 80 automatically locks the sub-key 12. Due to the sub-key unlocking process, the sub-key 12 becomes removable from the retainer 70 only when the master key 11 is located in the passenger compartment. In this case, however, the problems described below may occur when the vehicle electronic portable key system is set in the valet mode. When the vehicle electronic portable key system is set in the valet mode, only the sub-key 12 is located in the interior wireless communicatable area B. In other words, the master key 11 is not located near the vehicle 20. In such a state, for example, if the person borrowing the sub-key 12 inadvertently retains the sub-key 12 in the retainer 70, the sub-key 12 would become irremovable from the retainer 70.

To solve this problem, in the first embodiment, the vehicle electronic portable key system issues a warning from the speaker 92 notifying that the sub-key 12 will become irremovable and keeps the sub-key 12 unlocked with the sub-key locking mechanism 80 for a predetermined time. The vehicle electronic portable key system executes the valet mode lending flag setting process in parallel to the issuance of the warning notifying that the sub-key 12 will become irremovable and sets the lending flag Fs to the off state.

Figure 7:
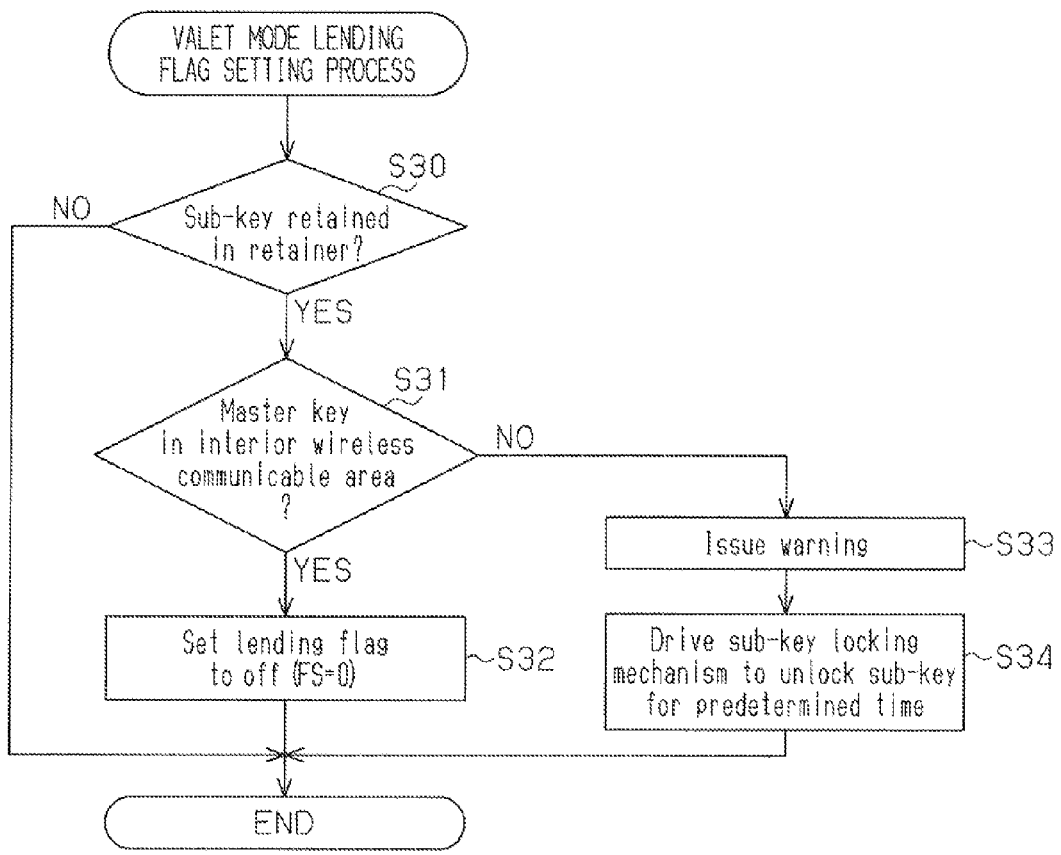
FIG. 7 is a flowchart of a lending flag setting process performed in a valet mode.

The valet mode lending flag setting process executed by the valet control unit 90 will now be discussed with reference to FIG. 7. First, the valet control unit 90 determines whether or not the sub-key 12 is retained in the retainer 70 from the output signal of the microswitch 74 (step S30). When determining that the sub-key 12 is not retained in the retainer 70 (step S30: NO), the valet control unit 90 ends this process.

When determining that the sub-key 12 is retained in the retainer 70 (step S30: YES), the valet control unit 90 determines whether or not the master key 11 is located in the interior wireless communicatable area B (step S31). When determining that the master key 11 is located in the interior wireless communicatable area B (step S31: YES), the lending flag Fs is set to an off state (step S32).

When determining that the master key 11 is not located in the interior wireless communicatable area B (step S31: NO), the valet control unit 90 issues a warning from the speaker 92 notifying that the sub-key 12 will become irremovable (step S33). The valet control unit 90 also drives the sub-key locking mechanism 80 to have the sub-key 12 unlocked for a predetermined time (step S34).

Due to the execution of the valet mode lending flag setting process, even if the person borrowing the sub-key 12 leaves the sub-key 12 retained in the retainer 70 when the vehicle electronic portable key system is set in the valet mode, the warning notifying that the sub-key 12 will become irremovable from the retainer 70 and the unlocking of the sub-key 12 prompts the person borrowing the sub-key 12 to remove the sub-key 12 from the retainer 70. This avoids a situation in which the sub-key 12 becomes irremovable from the retainer 70. Thus, a situation is avoided in which the person borrowing the sub-key 12 is formed to borrow the master key 11 as well from the vehicle owner.

Figure 8:
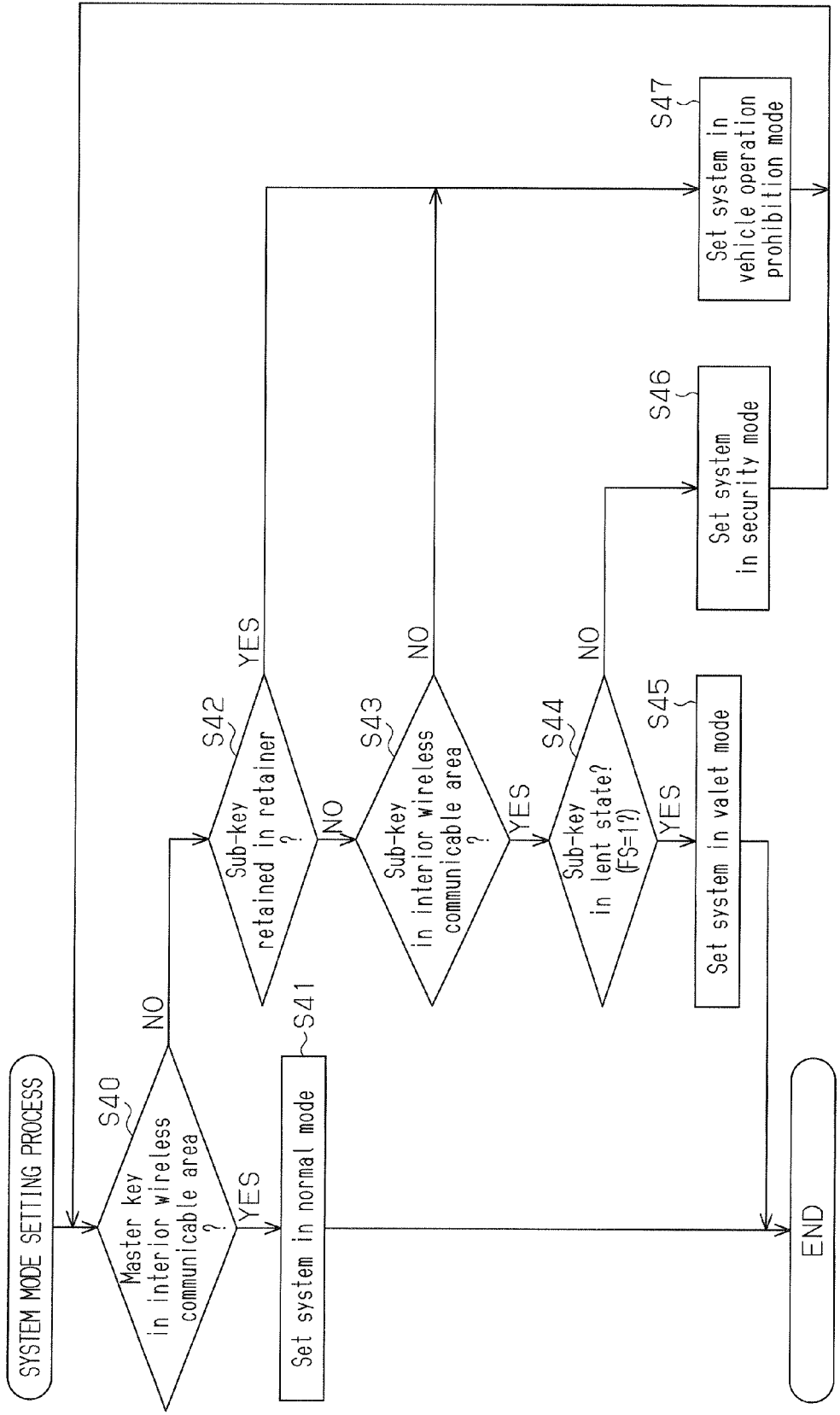
FIG. 8 is a flowchart showing a system mode setting process.

A system mode setting process executed by the vehicle control unit 60 will now be discussed with reference to FIG. 8. The process of FIG. 8 is executed when the vehicle control unit 60 determines, for example, with the door courtesy switch 33a that the open driver door 21a has been closed. In other words, the system mode setting process is executed when a vehicle occupant opens and closes the driver door 21a.

The vehicle control unit 60 first determines whether or not the master key 11 is located in the interior wireless communicatable area B (step S40). More specifically, in step S40, when a response signal from the master key 11 is received after the opening and closing of the driver door 21a causes transmission of a request signal from the interior transmitter 31, the vehicle control unit 60 determines that the master key 11 is located in the interior wireless communicatable area B. When determining that the master key 11 is located in the interior wireless communicatable area B (step S40: YES), the vehicle control unit 60 sets the vehicle electronic portable key system in the normal mode (step S41).

When determining that the master key 11 is located in the interior wireless communicatable area B (step S40: NO), the vehicle control unit 60 determines whether or not the sub-key 12 is retained in the retainer 70 from the on/off information of the microswitch 74 retrieved from the valet control unit 90 (step S42). When determining that the sub-key 12 is not retained in the retainer 70 (step S42: NO), the vehicle control unit 60 determines whether or not the sub-key 12 is located in the interior wireless communicatable area B (step S43). More specifically, in step S43, when a response signal from the sub-key 12 is received after the opening and closing of the driver door 21a causes transmission of a request signal from the interior transmitter 31, the vehicle control unit 60 determines that the sub-key 12 is located in the interior wireless communicatable area B. When determining that the sub-key 12 is located in the interior wireless communicatable area B (step S43: YES), the vehicle control unit 60 determines whether the sub-key 12 is in a lent state from the on/off information of the lending flag Fs (step S44). More specifically, in step S44, when the lending flag Fs is in an on state, that is, when the lending flag Fs has a value of "1", the vehicle control unit 60 determines that the sub-key 12 is being lent. When determined that the sub-key 12 is in a lent state (step S44: YES), the vehicle electronic portable key system is set in the valet mode (step S45).

When determining in step S42 that the sub-key 12 is retained in the retainer 70 (step S42: YES) or determining in step S43 that the sub-key 12 is not located in the interior wireless communicatable area B (step S42: NO), the vehicle control unit 60 sets the vehicle electronic portable key system in the vehicle operation prohibition mode (step S47). If the vehicle electronic portable key system is set in the vehicle operation prohibition mode in this manner, the vehicle electronic portable key system remains in the vehicle operation prohibition mode until the master key 11 enters the interior wireless communicatable area B (step S40: YES) or until the sub-key 12 becomes removed from the retainer 70 (step S42: NO) and located in the interior wireless communicatable area B (step S43: YES). As a result, for example, when the vehicle owner carrying the master key 11 or the person borrowing the sub-key 12 leaves the parked vehicle 20, the vehicle electronic portable key system, which is set in the vehicle operation prohibition mode, ensures the security of the vehicle 20.

When determining that the sub-key 12 is not in a lent state (step S44: NO), the vehicle control unit 60 sets the vehicle electronic portable key system in the security mode (step S46). When the vehicle electronic portable key system is set in the security mode, the vehicle electronic portable key system remain in the security mode until the master key 11 enters the interior wireless communicatable area B (step S40: YES) or until the sub-key 12 is determined as being in the lent state (step S44: YES).

In the vehicle electronic portable key system, when the vehicle owner who is carrying the master key 11 removes the sub-key 12 from the retainer 70, the lending flag Fs is set to the on state. Thus, when the person borrowing the sub-key 12 is in the vehicle 20, the vehicle electronic portable key system is set in the valet mode. In other words, the person borrowing the sub-key 12 is permitted to perform various operations of the vehicle 20 although the speed at which the vehicle 20 can be driven is restricted and the trunk lid 22 cannot be unlocked. However, for example, if a person breaks into the vehicle without the vehicle owner knowing and wrongfully removes the sub-key 12 from the retainer 70, the lending flag Fs continuously remains in the off state. Thus, the vehicle electronic portable key system is set in the security mode during the period in which the person who has wrongfully removed the sub-key 12 is in the vehicle 20. In this case, the person who wrongfully removed the sub-key 12 cannot start the engine even when pressing the engine start switch 24 and cannot unlock the trunk lid 22. In addition, if the person who wrongfully removed the sub-key 12 presses the engine start switch 24, security measures are taken. For example, a warning is issued with a warning device such as the horn 51. This deters a person who has stolen the sub-key 12 from performing unauthorized vehicle operations and thereby improves the security level of the vehicle electronic portable key system.

In the above description, the vehicle control unit 60 and the valet control unit 90 are illustrated as two units. However, as long as the controls described are executed, the vehicle control unit 60 and the valet control unit 90 may be formed by a single control unit. The term "control unit" may refer to either one of or both of the vehicle control unit 60 and the valet control unit 90.

As described above, in the first embodiment, the vehicle electronic portable key has the advantages described below.

(1) The vehicle electronic portable key system includes the retainer 70, which is arranged in the passenger compartment (e.g., center console 25), to retain the sub-key 12. In a state in which the master key 11 is detected as being located in the interior wireless communicatable area B, the vehicle electronic portable key system determines that the sub-key 12 is in a lent state when removal of the sub-key 12 from the retainer 70 is detected. Further, unless the sub-key 12 is determined as being in a lent state when the sub-key 12 is removed from the retainer 70 and detected as being located in the interior wireless communicatable area V, the vehicle electronic portable key system is set in the security mode. In other words, the starting of the engine is prohibited even if the engine start switch 24 is pressed. This deters a person who has stolen the sub-key 12 from performing unauthorized vehicle operations and thereby improves the security level of the vehicle electronic portable key system.

(2) If the engine start switch 24 is pressed when the vehicle electronic portable key system is set in the security mode, the vehicle electronic portable key system takes security measures. For example, a warning is issued with a warning device such as the horn 51. Since the person who wrongfully removes the sub-key 12 is given a warning, unauthorized vehicle operations are prevented beforehand.

(3) The sub-key locking mechanism 80, which locks the sub-key 12 that is retained in the slot 71, is arranged in the retainer 70. The sub-key locking mechanism 80 automatically locks the sub-key 12 when the sub-key 12 is retained in the slot 71. The sub-key locking mechanism 80 unlocks the sub-key 12 when the sub-key removal switch 73 is pressed as long as the master key 11 is located in the interior wireless communicatable area B. This prevents the sub-key 12 from being stolen by a person who has broken into the vehicle 20. Thus, the security level of the vehicle electronic portable key system is further increased.

(4) If the master key 11 is not located in the interior wireless communicatable area B when the sub-key 12 is retained in the retainer 70, the vehicle electronic portable key system, for example, uses the speaker 92 to issue a warning notifying that the sub-key 12 will become irremovable from the retainer 70. Further, the vehicle key system drives the sub-key locking mechanism 80 to keep the sub-key 12 unlocked. This avoids a situation in which the sub-key 12 becomes irremovable from the retainer 70. Thus, a situation in which the person borrowing the sub-key 12 has to borrow the master key 11 from, for example, the vehicle owner may be avoided.

A second embodiment of a vehicle electronic portable key system according to the present invention will now be discussed.

In the first embodiment, the vehicle control unit 60 transmits a request signal from each exterior transmitter 30 in predetermined cycles when, for example, the vehicle 20 is parked. When receiving a response signal from the master key 11 in response to the request signal, the vehicle control unit 60 unlocks the doors 21a to 21d and the trunk lid 22. When receiving a response signal from the sub-key 12 in response to the request signal, the vehicle control unit 60 unlocks only the doors 21a to 21d.

Instead of the above configuration, the second embodiment uses a capacitance sensor 52, which is arranged in a door knob of the driver door 21a to detect changes in capacitance at the periphery of the door knob. When the capacitance sensor 52 detects a change in the capacitance, the vehicle control unit 60 determines that a vehicle occupant has touched the door knob of the driver door 21a with his or her hand. As a result, the vehicle control unit 60 transmits a request signal to each exterior wireless communicatable area A, determines whether the master key 11 or the sub-key 12 is located in the exterior wireless communicatable area A, and unlocks the doors 21a to 21d and the trunk lid 22.

A door unlocking process executed by the vehicle control unit 60 will now be discussed with reference to FIG. 9. The door unlocking process is executed when the capacitance sensor 52 detects a capacitance change, that is, when a vehicle occupant touches the door knob of the door 21a with his or her hand.

As shown in FIG. 9, in this process, the vehicle control unit 60 first determines whether or not the master key 11 is located in one of the exterior wireless communicatable areas A (step S50). More specifically, in step S50, when a response signal is received from the master key 11 after the vehicle occupant touches the door knob of the driver door 21a with his or her hand and the transmitters 30 thereby transmit a request signal, the vehicle control unit 60 determines that the master key 11 is located in one of the exterior wireless communicatable areas A. When determining that the master key 11 is located in one of the exterior wireless communicatable areas A (step S50: YES), the vehicle control unit 60 unlocks the doors 21a to 21d and the trunk lid 22 with the door lock mechanisms 41 to 45 (step S51).

When determining that the master key 11 is not located in the exterior wireless communicatable area A (step S50: NO), the vehicle control unit 60 determines whether or not the sub-key 12 is located in one of the exterior wireless communicatable areas A (S52). More specifically, in step S52, when a response signal is received from the sub-key 12 after the vehicle occupant touches the door knob of the driver door 21a with his or her hand and the transmitters 30 thereby transmit a request signal, the vehicle control unit 60 determines that the sub-key 12 is located in one of the exterior wireless communicatable areas A. When determining in step S52 that the sub-key 12 is located in one of the exterior wireless communicatable areas A (step S52: YES), the vehicle control unit 60 determines whether or not the sub-key 12 is in a lent state from the on/off information of the lending flag Fs (step S53). When determining in step S53 that the sub-key 12 is in a lent state (step S53: YES), the vehicle control unit 60 unlocks the doors 21a to 21d with the door lock mechanisms 41 to 44.

When determining in step S52 that the sub-key 12 is not located in one of the exterior wireless communicatable areas A (step S52: NO) or determining in step S53 that the sub-key 12 is not in a lent state (step S53: NO), the vehicle control unit 60 terminates this process.

The vehicle electronic portable key system prohibits unlocking of the doors 21a to 21d when a person who wrongfully removes the sub-key 12 from the retainer 70 attempts to open the doors 21a to 21d. As a result, the person who wrongfully removes the sub-key 12 from the retainer 70 cannot enter the vehicle 20. This deters a person who has stolen the sub-key 12 from performing unauthorized vehicle operations and thereby improves the security level of the vehicle electronic portable key system.

As described above in detail, in addition to advantages (1) to (4) of the first embodiment, the second embodiment has the advantage described below.

(5) If the sub-key 12 that has been removed from the retainer 70 is detected as being located in one of the exterior wireless communicatable areas A, the vehicle electronic portable key system prohibits unlocking of the doors 21a to 21d when determining that the sub-key 12 is not in a lent state. As a result, a person who wrongfully removes the sub-key 12 cannot enter the vehicle 20. This deters a person who has stolen the sub-key 12 from performing unauthorized vehicle operations and thereby improves the security level of the vehicle electronic portable key system.

It should be apparent to those skilled in the art that the present invention may be embodied in many other specific forms without departing from the spirit or scope of the invention. Particularly, it should be understood that the present invention may be embodied in the following forms.

In the above-described embodiments, the sub-key unlocking process is repetitively performed in predetermined cycles when a vehicle access switch is activated, that is, when the main power of the vehicle 20 is activated. Instead, the sub-key unlocking process may be executed, for example, when detecting with the door courtesy switch 33a that the open driver door 21a has closed, that is, when a vehicle occupant opens and closes the driver door 21a. Further, the sub-key unlocking process may be repetitively executed in predetermined cycles when the microswitch 74 is activated, that is, when the sub-key 12 is retained in the retainer 70.

In the above-described embodiments, the normal mode lending flag setting process and the valet mode lending flag setting process are performed when the engine is running. Instead, the normal mode lending flag setting process and valet mode lending flag setting process may be repetitively executed in predetermined cycles, for example, when the microswitch 74 is deactivated, that is, when the sub-key 12 is removed from the retainer 70.

In the above-described embodiments, when set in the valet mode, the vehicle electronic portable key system prohibits the unlocking of the trunk lid 22 and restricts the speed at which the vehicle can be driven to a predetermined speed. Instead, for example, only the unlocking of the trunk lid 22 may be prohibited. It is only required that the vehicle operations that can be performed be limited when the vehicle electronic portable key system is set in the valet mode to prevent a person who has borrowed the sub-key 12 from performing unauthorized operations.

In the above-described embodiments, the vehicle electronic portable key system prohibits unlocking of the trunk lid 22 when determining that only the sub-key 12 is located in the interior wireless communicatable area B in a state in which the sub-key 12 is being lent. Instead, the vehicle electronic portable key system may permit every one of the vehicle operations, including the unlocking of the trunk lid 22, when determining that only the sub-key 12 is located in the interior wireless communicatable area B in a state in which the sub-key 12 is being lent. In other words, the sub-key 12 may be a spare key having the same functions as the master key 11. In this case, the vehicle electronic portable key system is set in the normal mode in step S45, which is shown in FIG. 8.

In the above-described embodiments, as long as the master key 11 is not located in the interior wireless communicatable area B when the sub-key 12 is retained in the retainer 70, the vehicle electronic portable key system uses the speaker 92 to issue a warning notifying that the sub-key 12 will become irremovable from the retainer 70 and drives the sub-key locking mechanism 80 to keep the sub-key 12 unlocked. Instead, for example, a warning lamp may be arranged on the instrument panel 23 and be lit to issue a warning notifying that the sub-key 12 will become irremovable from the retainer 70. Further, when a speaker arranged in the vehicle compartment cannot be added with a function for issuing a warning notifying that the sub-key 12 will become irremovable from the retainer 70, a warning with such a speaker is not issued and only the sub-key locking mechanism 80 may be driven to keep the sub-key 12 unlocked.

In the above-described embodiments, the valet mode lending flag setting process drives the sub-key locking mechanism 80 to keep the sub-key 12 unlocked when the sub-key 12 is retained in the retainer 70 as long as the master key 11 is not located in the interior wireless communicatable area B. When the sub-key unlocking mechanism keeps the sub-key 12 continuously unlocked, the temperature of the electromagnetic coil 82e may become excessively high when energized for a long period. Therefore, in the valet mode lending flag setting process, the process for keeping the sub-key 12 unlocked in step S33 and the process for issuing a warning notifying that the sub-key 12 will become irremovable do not have to be performed. In other words, when the vehicle electronic portable key system is set in the valet mode, the process illustrated in FIG. 6 may be executed.

In the above-described embodiments, the sub-key locking mechanism 80 is arranged in the retainer 70 to lock the retained sub-key 12. However, the sub-key locking mechanism 80 may be eliminated when, for example, there is not enough space for the sub-key locking mechanism 80 in the retainer 70. When the sub-key locking mechanism 80 is eliminated from the retainer 70 in this manner, the sub-key removal switch 73 may also be eliminated, and execution of the sub-key unlocking process illustrated in FIG. 5 becomes unnecessary. When the sub-key unlocking process is not executed, the lending flag Fs will not be set to an on state. Thus, a process for setting the lending flag Fs to an on state will become necessary. Accordingly, the vehicle electronic portable key system may execute a process for setting the lending flag Fs to an on state if the microswitch 74 is deactivated when the master key 11 is located in the interior wireless communicatable area B.

In the above-described embodiments, when the vehicle electronic portable key system of the vehicle 20 is set in the security mode, the starting of the engine and the unlocking of the trunk lid 22 are prohibited. Further, security measures are taken including the issuance of a warning with a warning device such as the horn 51. However, if security measures including the issuance of a warning with a warning device such as the horn 51 are not necessary, only the starting of the engine and the unlocking of the trunk lid 22 may be prohibited.

In the above-described embodiments, when the vehicle electronic portable key system of the vehicle 20 is set in the security mode, some of the vehicle operations, such as the starting of the engine and the unlocking of the trunk lid 22, are prohibited. However, all of the vehicle operations may be prohibited.

In the above-described embodiments, the vehicle electronic portable key system includes a total of two electronic portable keys, with one being the master key 11 and the other being the sub-key 12. Instead, the vehicle electronic portable key system may include three or more electronic portable keys. For example, the vehicle electronic portable key system may include three electronic portable keys, with one being the master key 11 and two being the sub-key 12. When there is more than one sub-key 12, the retainer 70 may include a slot for each sub-key 12.

In the above-described embodiments, the retainer 70 is arranged in the center console 25 of the vehicle 20. Instead, the retainer 70 may be arranged in, for example, the glove box of the vehicle.

The present examples and embodiments are to be considered as illustrative and not restrictive, and the invention is not to be limited to the details given herein, but may be modified within the scope and equivalence of the appended claims.

What is claimed is:
1. A vehicle electronic portable key system comprising:
an electronic portable key capable of performing wireless communication and comprising a plurality of keys including a master key and a sub-key;
a retainer arranged in a vehicle to retain the sub-key in the vehicle; and a control unit which monitors wireless communication performed between each of the plurality of keys and the vehicle to determine whether the master key or the sub-key is located in an interior wireless communicatable area formed inside the vehicle or an exterior wireless communicatable area formed outside the vehicle;

wherein in a state in which the master key or the sub-key is detected as being located in either one of the wireless communicatable areas, the control unit is programmed to permit various operations of the vehicle to be performed in accordance with the communicable area in which the detected master key or the sub-key is located;

wherein the control unit is programmed to determine that the sub-key is in a lent state when removal of the sub-key from the retainer is detected in a state in which the master key is located in the interior wireless communicatable area; and wherein in a state in which the sub-key is detected as being located in the interior wireless communicatable area or the exterior wireless communicatable area after removal from the retainer, the control unit is programmed to limit the operations of the vehicle that can be performed in accordance with the communicable area in which the sub-key is located unless the sub-key is determined as being in the lent state.

2. The vehicle electronic portable key system according to claim 1, wherein when determining that the sub-key is not in the lent state, the control unit prohibits all of the operations of the vehicle in a state in which the sub-key is detected as being located in the interior wireless communicatable area or the exterior wireless communicatable area after removal from the retainer.

3. The vehicle electronic portable key system according to claim 1, wherein when determining that the sub-key is not in the lent state, the control unit activates a warning device arranged in the vehicle to issue a warning in a state in which the sub-key is detected as being located in the interior wireless communicatable area or the exterior wireless communicatable area after removal from the retainer.

4. The vehicle electronic portable key system according to claim 1, wherein:

the retainer includes a sub-key locking mechanism, which locks the sub-key in a state retained in the retainer, and a sub-key removal switch, which when pressed by a vehicle occupant unlocks the sub-key from the sub-key unlocking mechanism; and the sub-key locking mechanism automatically locks the sub-key when the sub-key is retained in the retainer and unlocks the sub-key when the sub-key removal switch is pressed in a state in which the master key is located in the vehicle.

5. The vehicle electronic portable key system according to claim 4, wherein when presence of the master key in the vehicle is undetected at a time in which the sub-key is retained in the retainer, the control unit issues a notification that the sub-key will become irremovable from the retainer after a predetermined time, during which the control unit maintains the sub-key unlocked.

6. The vehicle electronic portable key system according to claim 1, wherein the control unit prohibits selected ones of the operations of the vehicle in a state in which the sub-key is detected as being located in the interior wireless communicatable area or the exterior wireless communicatable area after removal from the retainer.

7. The vehicle electronic portable key system according to claim 1, wherein the control unit prohibits unlocking of a trunk lid of the vehicle, permits starting of the engine of the vehicle, and restricts the speed at which the vehicle is driven in a state which the sub-key is detected as being located in the interior wireless communicatable area or the exterior wireless communicable area after removal from the retainer.

* * * * *